Figure 1:
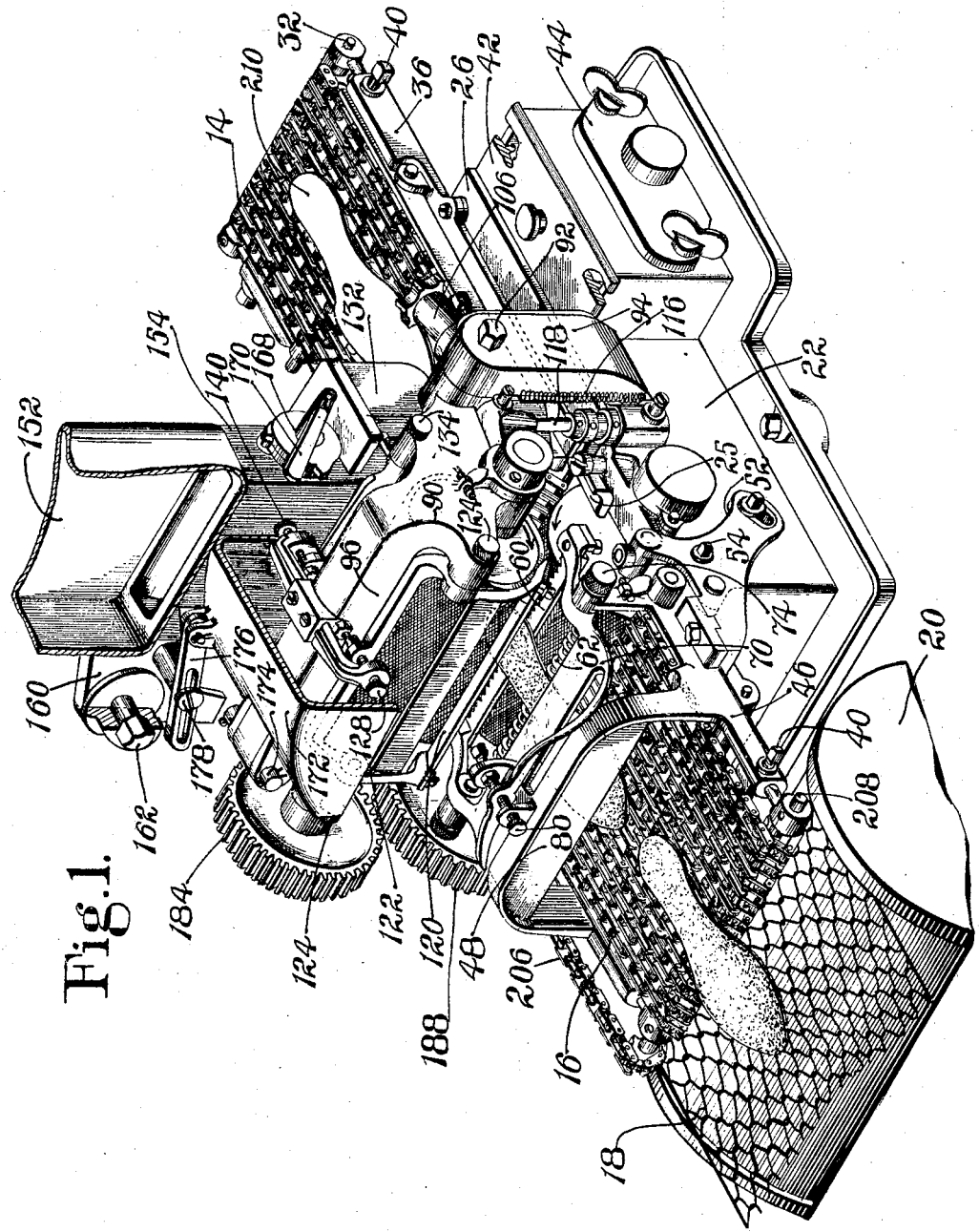

April 14, 1931. J. W. COSGROVE 1,800,510
CEMENTING MACHINE
Filed Oct. 20, 1927 3 Sheets-Sheet 1

INVENTOR
John W. Cosgrove
By his Attorney,
Nelson W. Howard

April 14, 1931. J. W. COSGROVE 1,800,510
CEMENTING MACHINE
Filed Oct. 20, 1927 3 Sheets-Sheet 3

INVENTOR.
John W. Cosgrove
By his Attorney
Nelson W. Howard

Patented Apr. 14, 1931

1,800,510

UNITED STATES PATENT OFFICE

JOHN W. COSGROVE, OF MEDFORD, MASSACHUSETTS, ASSIGNOR TO UNITED SHOE MACHINERY CORPORATION, OF PATERSON, NEW JERSEY, A CORPORATION OF NEW JERSEY

CEMENTING MACHINE

Application filed October 20, 1927. Serial No. 227,559.

This invention relates to coating machines and is herein illustrated as embodied in a machine for applying cement to boot and shoe parts of the type shown in United States Letters Patent No. 1,380,361, granted June 7, 1921, upon my application. An object of the present invention is to provide an improved machine for coating one or both surfaces of pieces of work and doing it more expeditiously regardless of whether the pieces are rigid or flexible.

In some factories, notably those devoted to the making of rubber shoes, various sizes and shapes of pieces are coated with cement and then delivered to a long conveyor for example, one extending across the factory, in order to give the coating a chance to dry enough to make it practicable to handle the pieces before it is necessary for an assistant operator to remove the coated pieces from the conveyor. The pieces are removed manually from this drying conveyor and placed in "books" in which the number of pieces necessary for one lot of shoes is accumulated and transferred to the operator who will later make up the shoes. Some of these pieces of work are very flexible and correspondingly hard to feed into the machine smoothly. Accordingly, since it is possible to drive the cementing machine at a considerable rate of speed because of the fact that pieces are removed promptly and steadily by the long drying conveyor, it is found desirable to provide the cementing machine with short presenting and delivery conveyors so that the operator can lay such flexible pieces upon a presenting conveyor rather than pushing them between the rolls, thereby feeding the pieces of work to the machine faster without danger and so that the work can be transferred to the drying conveyor without requiring it to be touched by the operator. Since there is no uniform relation between the level of the drying conveyor in the factory and the level of the delivery conveyor of the machine, it is found in some instances that the drying conveyor may be so far below the delivery conveyor that there is a tendency for the pieces of work to buckle or to fold over upon themselves as they pass from the delivery conveyor to the drying conveyor.

To overcome this difficulty and in accordance with a feature of the invention, the illustrated improved machine is provided with a delivery conveyor which is supported in a novel manner so that it may be set at various angles with respect to the machine to bring its delivery end into just the desired relation to the level of the drying conveyor. This done, there is no difficulty about the smooth passage of the pieces from the delivery conveyor to the surface of the drying conveyor. Other features of the invention reside in the provision of a detachably mounted supporting frame for the delivery conveyor so that said conveyor may be removed for cleaning without disturbing the adjustments of its supports, and an arrangement for driving the delivery conveyor from the machine by connections to the rotatable support at the outer end of the conveyor so that the upper run of the conveyor is maintained taut.

The operators of cementing machines in shoe factories and the like are young boys and girls who are not supposed to be skilled mechanics. At the same time, it is inherent in the operation of such machines that numerous adjustable and movable parts will become smeared with cement during the use of the machine so that for the best operation of the machine, they should be removed and cleaned every night at the close of work. If, however, it is necessary to go to considerable trouble to do this cleaning, the operators will neglect it and the machine may be so clogged and gummed up that there will be a breakage of parts when it is started again in the morning. Along with this difficulty, there is the difficulty that the adjustable parts are not likely to be properly readjusted if it is necessary to remove them for cleaning purposes. With these difficulties in view, still another feature of the invention resides in means for adjustably and removably positioning various parts of the machine which cooperates with the cement roll and, hence, are liable to become coated with cement, constructed and arranged to allow the removal of said parts and their repositioning on the machine without disturbing their predetermined adjustments. As illustrated, the adjustable parts are mounted upon the machine by means of removable pivots and are arranged to contact with an adjustable abutment, clamping means being provided to hold them against this abutment.

A machine of this general type may conveniently be arranged so that its upper roll is supplied with cement in a manner similar to that disclosed in the Letters Patent, to which reference has been made above. In that machine, the upper cement applying roll closes the open side of an auxiliary upper fountain receptacle, the edges of the open side of which are brought into close relation to the roll to prevent the accidental leakage of cement.

Still another feature of the invention resides in an improved arrangement for controlling the amount of cement taken out of the receptacle by the roll, in accordance with which the upper receptacle is pivotally mounted upon the machine so that the position of the bottom edge of the open side thereof with respect to the roll may be adjusted, thereby to control the quantity of cement. Preferably, and as illustrated, means comprising an adjustable abutment and a clamp for holding the receptacle in contact with this abutment are provided for determining the position of the receptacle.

In the illustrated machine, in accordance with still other features of the invention, cement is supplied to this upper receptacle by means of an inverted barometric supply tank, the neck of which dips into the end of the receptacle. This barometric tank is provided with a control valve and is tiltably mounted upon the frame of the machine so that it may be tipped to an upright position for filling. A tiltable cover is provided for the roll and certain cooperating adjustable parts of the machine and, for convenience, this cover is connected to the barometric tank by means of a link so that the tipping of the tank to upright position automatically raises the cover, it being understood that access to the adjustable parts is usually desired at a time when the tank is inverted, to wit, at the close of the day's work.

Figure 2:
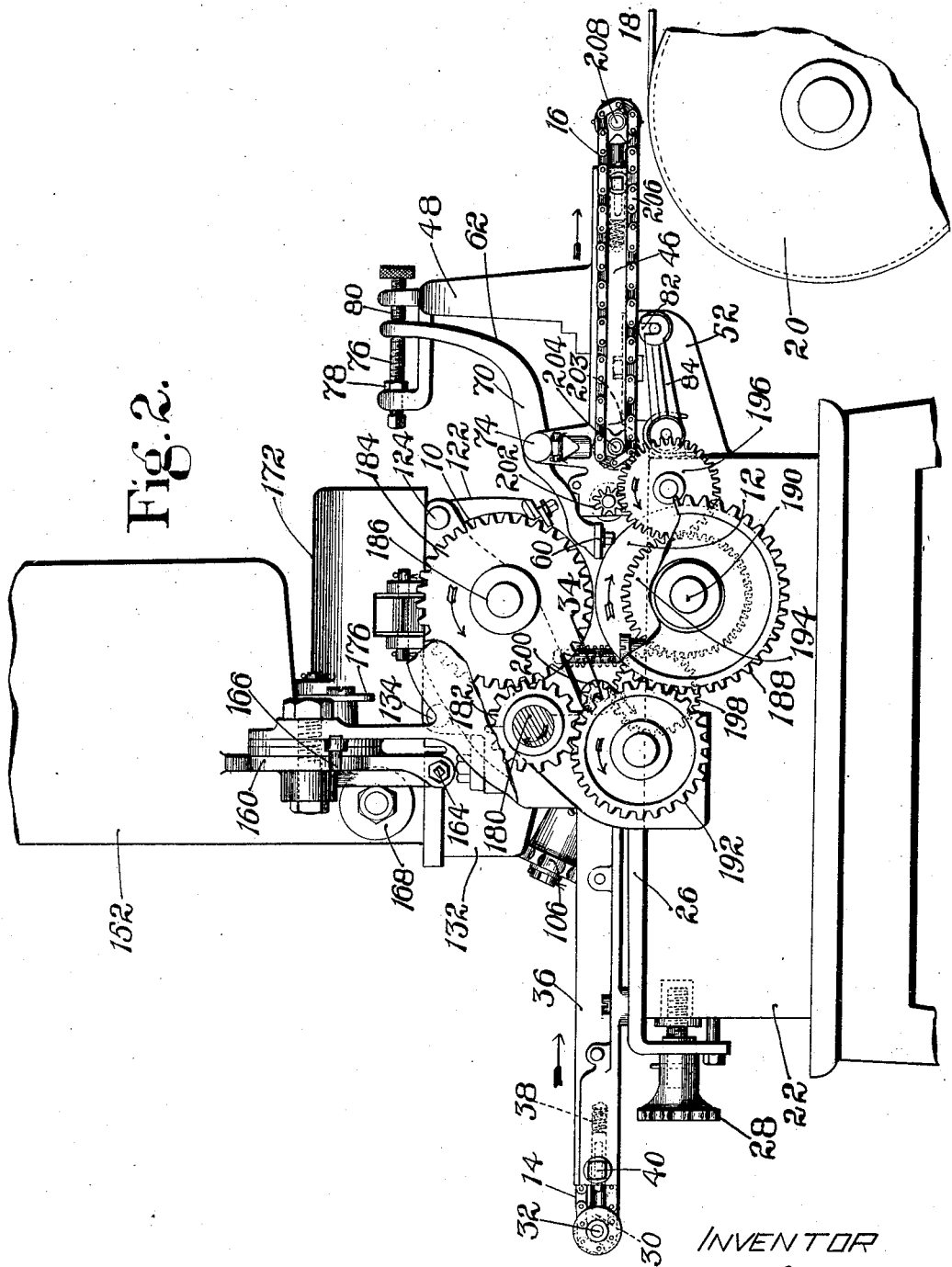
Figure 3:
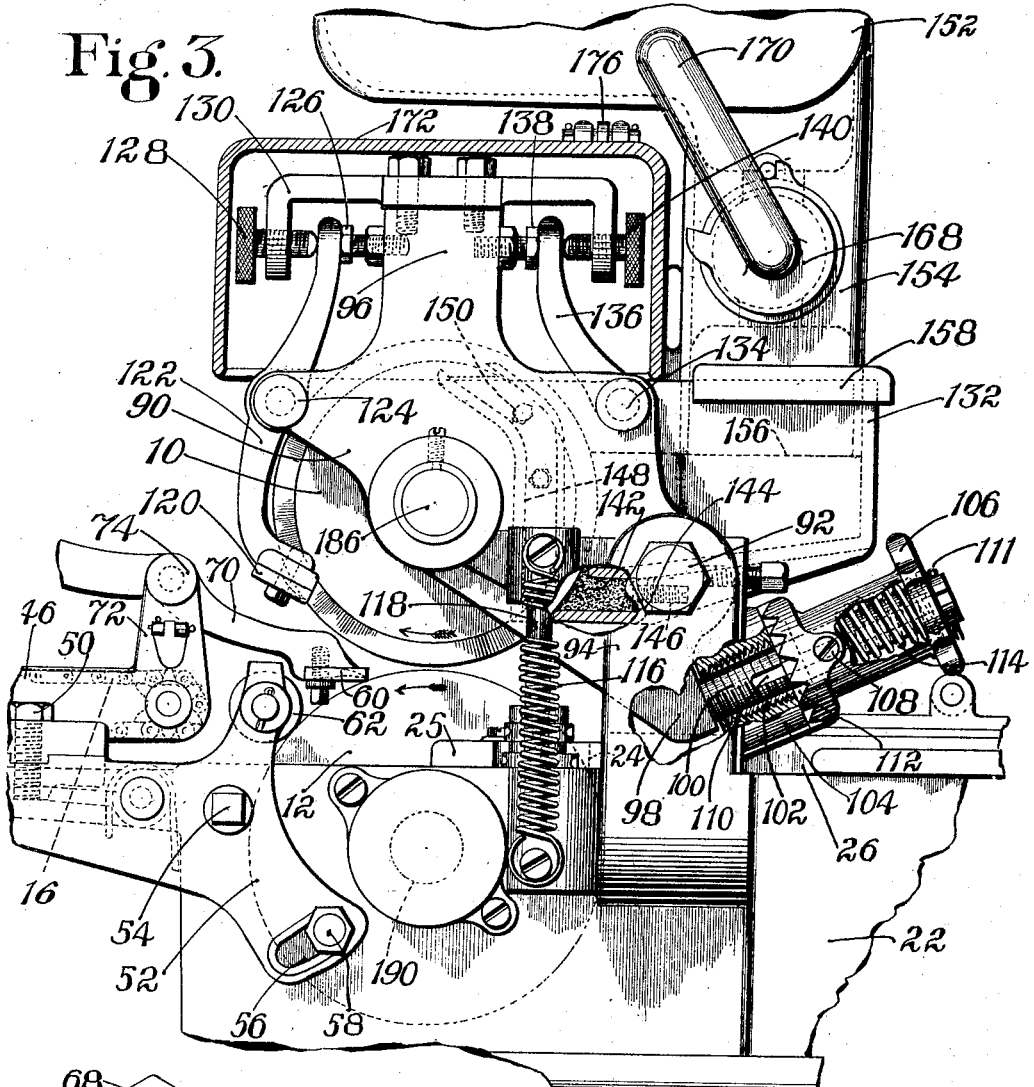
Figure 4:
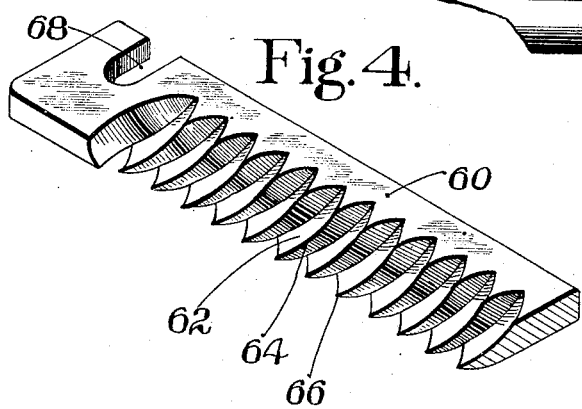

These and other features of the invention will now be set forth in detail, with reference to the accompanying drawings, in which, Fig. 1 is an angular view of the whole machine with parts broken away, Fig. 2 is a side elevation of the right side of the machine, Fig. 3 is an enlarged side elevation of the left side showing the ends of the applying rolls and various adjustable parts associated therewith, and Fig. 4 is a detailed view of one of the work strippers on an enlarged scale.

My improved machine, being arranged so that it may be used as a double cementer to coat opposite faces of pieces of work, is provided with superposed applying rolls 10 and 12 between which the pieces of work pass as they are presented thereto by the presenting conveyor 14. The machine may be used to coat only one side of each piece by supplying cement to only one of the rolls. A delivery conveyor 16 receives the coated pieces of work and deposits them upon the upper run of one end of a wire mesh drying conveyor 18 passing over a drum 20. This drying conveyor 18 takes the coated pieces to a distant point where they are removed manually and placed in "books" for subsequent use.

The lower roll 12 is journaled in the sides of a cement receptacle 22 and the amount of cement lifted out of the receptacle by the knurled surface of the roll is controlled by means of a scraper edge 24 (Fig. 3) upon a cover 26 (Fig. 2) which is slidingly mounted on the receptacle and may be adjusted by means of a hand wheel 28. Lateral extensions 25 (Fig. 1) on the cover 26 are arranged to scrape the ends of the roll 12 and are held down by screws. The presenting conveyor 14 is made up of a plurality of metallic link chains placed side by side and arranged to pass over sprockets 30 placed side by side upon spindles 32 and 34 mounted at opposite ends of a frame 36. This frame 36 is secured to the upper side of the cover 26 and springs 38 are provided for tensioning the chains of the conveyor by pushing outwardly studs which support the spindle 32, it being understood that after the chains have been tensioned the studs are held in outward position by means of set screws 40. It will be observed from Fig. 1 that the lower receptacle 22 may be filled by removing a cover 42 and that when it is desired to drain said receptacle for cleaning purposes, this may be accomplished by removing a side cover 44.

The delivery conveyor 16 is mounted in a frame 46 similar to the frame 36 except that this frame is provided with a transverse bridge member 48. This frame 46 of the said conveyor is detachably secured by means of bolts 50 to the arms of adjustable brackets 52 (one of these being removed in Fig. 2 for clearness). When it is desired to remove the delivery conveyor for cleaning, it is only necessary to remove the two bolts 50 and no adjustment is disturbed. These brackets 52 are pivoted upon studs 54 and one of them is provided with an elongated slot 56 so that the angle of the delivery conveyor 16 may be adjusted to bring it to just the desired relation to the drying conveyor 18 so that the coated pieces of work will be laid flat upon the drying conveyor. A clamping bolt 58 provides means by which the adjusted position of the delivery conveyor may be maintained.

In order to prevent pieces of work from clinging to the applying roll 12 and passing on down into the receptacle, a work stripper 60 cooperating with the surface of the roll is provided, which will be later more fully described, and the space between the applying roll 12 and the end of the conveyor 16 is bridged by means of a transfer roll 62 journaled in upstanding arms of the brackets 52. This transfer roll is provided with wide deep grooves between a series of disk-like ridges or ribs so that there is little contact between it and the work and consequently practically no tendency for the work to stick to it.

The stripper bar 60, illustrated more fully in Fig. 4, comprises a flat bar which has been grooved at 62 to provide intermediate ridges 64 extending out into pointed teeth 66 and the relation of the bar to a roll with which it cooperates is such that the ridges 64 are adjacent to the roll without contact therewith unless possibly at the very tips 66 of the teeth, thus providing a minimum of pick-up contact between the stripper and the cement roll for the removal of cement therefrom and at the same time assuring the perfect operation of the device in its normal function of stripping pieces or work from the roll. The stripper bar 60 is notched at each end, as at 68, to allow it to be bolted to the sides of a U-shaped carrying frame 70 which is pivotally mounted in upstanding brackets 72 upon the conveyor frame 46 by means of removable pivot pins 74. The position of the carrying frame 70 is adjustably determined by mechanism best shown in Fig. 2 comprising an adjustable abutment screw 76 supported in an upright lip upon the bridge 48 of the conveyor frame against which the frame 70 rests and from which it is freely removable. The abutment 76 having once been adjusted, it is located in adjusted position by means of a lock nut 78, and the upper cross member of the carrying frame 70 contacts with the end of the screw 76. During the operation of the machine, this contact is maintained by means of a clamping screw 80. When it is desired to remove the work stripper and its carrying frame 70 for the sake of cleaning it, it will be observed that it is only necessary to loosen the clamping screw 80 and to pull out the pivot pins 74, after which the carrying frame 70 may be taken bodily from the machine and easily cleaned. When the carrying frame 70 is replaced in the machine, it is only necessary to replace the pivot pins 74 and to bring the upper cross member of the carrying frame 70 against the abutment screw 76 and to clamp it in that position by means of the clamping screw 80. This operation does not change the adjustment of the device at all and only requires a firm pressure of the clamping screw 80. Thus, it is possible for even an unskilled operator to take the frame out and to clean it and the simplicity of the operation encourages keeping the machine in good order.

Inasmuch as the delivery conveyor must necessarily pick up some cement from the pieces of work carried by it, it has been found desirable to provide a cleaning roll 82 which is loosely held between pivoted arms 84 (Fig. 2) which are spring-pressed upwardly to hold the roll in contact with the lower run of the conveyor. This cleaning roll 82 comprises a metal spool wound with adhesive tape, gum rubber or any suitable substance to which the particles of cement are inclined to adhere. It will be understood that it is removed at intervals and the pieces of cement are scraped off.

The upper applying roll 10 is journaled in the sides of a sub-frame 90 which is pivotally mounted on stud bolts 92 carried in upstanding brackets 94 forming a part of the lower receptacle 22. The sub-frame 90 is provided with a transverse bridge 96 (Fig. 1) and with a depending toe 98 (Fig. 3), by means of which the position of the frame and its upper roll 10 are determined. This toe 98 rests against an adjustable stop screw 100. The stop screw 100 is threaded in a bushing 102 carried in a lug 104 upon one of the brackets 94. The position of the stop screw 100 may be adjusted by means of a hand-wheel 106 slidably and non-rotatably connected to said screw by means of a transverse bolt 108 passing through a slot 110 in the screw. The handle 106 is held on the screw 100 by means of a spring 114 interposed between the bolt 108 and a cotter pin 111 and the lower edge of the hand wheel is notched or toothed at 112 to engage a pointed opposing stud or tooth (not shown) which is carried in the lug 104. The spring 114 located within a recess of the hand-wheel 106 bears against the transverse bolt 108 to press the notched end 112 of the handle into normal engagement with this stud thereby forming a sort of locking ratchet to prevent displacement of the adjusted position of the screw until the hand-wheel is pulled up against the tension of the spring 114. A light tension spring 116 is interposed between the main frame of the machine and the sub-frame 90 in order to prevent too violent movement of the upper roll as it is lifted by the passage of pieces of work and a stop 118 is adjustably mounted on the main frame and is arranged to prevent actual contact between the rolls 10 and 12 in case the operator is careless in adjusting the stop screw 100.

The upper roll 10 is provided with a work stripper 120 exactly similar to the stripper 60 already described except that it is placed in inverted position and this stripper 120 is carried in a frame 122 which is supported by means of removable pivot pins 124. The upper portion of the frame 122 rests against an adjustable abutment 126 and is clamped against this abutment by means of a clamping screw 128 carried in a transverse bracket 130 secured to the bridge 96 of the sub-frame 90.

The supply of cement to the upper roll 10 is delivered by means of an open-sided fountain receptacle 132 such as disclosed in the Letters Patent No. 1,380,361, above mentioned, but here this receptacle is adjustably mounted upon removable pivot pins 134, the position of the receptacle being determined by means of an upright arm 136 integral with a rod extending across the receptacle. The upper end of the arm 136 rests against an adjustable abutment 138 where it is held by means of locking means in the form of a clamping screw 140. It will be observed from Fig. 3 that the lower edge of the open side of the receptacle is provided with a packing felt 142 backed up by a strip of metal 144 and the compression of the felt is determined by screws 146 bearing against this strip of metal. The quantity of cement taken out of the receptacle by the upper roll 10 is determined by the relation of the lower edge of the open side of the receptacle to the down-going side of the roll 10 and this in turn is determined by the position of the receptacle itself as it is adjusted by adjusting the abutment 138 and bringing the upright arm 136 into contact therewith. The lateral edges of the open side of the receptacle overlap the ends of the roll 10 and are provided with packing felts held between the ribs 148 shown in dotted lines in Fig. 3. Set screws 150 are provided to press against these lateral packing strips to determine the pressure thereof against the roll.

Since the capacity of the open-sided fountain receptacle 132 is limited, it is found desirable to provide an additional automatic supply of cement thereto and this is effected by positioning a barometric supply tank 152 in such a position that its neck 154 dips into the receptacle 132 and supplies cement thereto to a level 156 indicated by the dotted line in Fig. 3. A cover 158 for the receptacle 132 is formed integrally upon the neck 154. The barometric tank 152 has a lateral lug 160 (Figs. 1 and 2), by means of which it is pivotally mounted upon a bolt 162 carried on the main frame of the machine so that it is possible to invert the tank by tilting it around this pivot bolt. An adjustable stop screw 164 is provided in a depending portion of the lug 160 and this screw is arranged to contact with a portion of the frame of the machine to determine the upright position of the tank and hence the position of the level 156 in the receptacle. Another stop 166 located upon the main frame of the machine forms a rest for the tank 152 when it has been tipped over for filling. In order to prevent an outflow of cement as the tank is tipped over, a valve 168 with an operating handle 170 is mounted in the neck 154 so that the remaining cement in the tank may be held therein as the tank is tipped over. A cover 172 is provided for the roll 10 and the adjacent parts including the transverse bridge 96 and the adjustable abutments 126 and 138 secured therein, this cover being pivotally mounted on a stud 174 (Fig. 1) and extending over the whole length of the bridge 96 to a point just above the removable pivot pins 124 and 134 (Fig. 1). Since it is usually desired to get at the clamping screws 128 and 140 at the same time that the tank 152 is tipped back, a connecting link 176 is provided between the cover and said tank 152, this link being slotted to engage a screw 178 extending laterally from the lug 160. Thus when the operator wants to leave the machine for the night, the flow of cement from the tank 152 may be cut off by operating the handle 170 and the tank may be tipped back, thereby lifting up the cover 172 and giving access to the clamping screws 128 and 140. In order to empty the upper receptacle 132, the cover 26 of the lower receptacle 22 is drawn back by means of the operating handle 28 and one of the pivot pins 134 for the upper receptacle is withdrawn to allow the cement to flow out from the crack between the packing felt 142 and the upper roll. This cement will run over the surface of the lower roll down into the lower receptacle where it may be kept for the night if desired, or, of course, from which it may be drained off by removing the cover 44 (Fig. 1). After the cement has flowed out of the upper receptacle, the latter may be wholly removed by loosening the clamping screw 140 and taking out the other pivot pin 134. In actual practice, it is found that it is most convenient to leave this upper receptacle 132 on the machine during the night and that in the morning the slight amount of cement remaining in said upper receptacle has formed itself into a sort of skin which may be rubbed off without any trouble.

The machine may be driven from any suitable source of power through a drive shaft 180 (Fig. 2) upon which is mounted a gear 182 meshing with a gear 184 on the shaft 186 of the upper roll 10. A gear 188 mounted on the shaft 190 of the lower roll 12 is also driven from the shaft 180 through an interposed idler 192. On this same shaft 190 there is provided a gear 194 meshing with idler gears 196 and 198 which are arranged to drive the conveyors 16 and 14 respectively. The idler 198 meshes with a gear 200 on the sprocket shaft 34 while the idler 196 meshes with a gear 202 by means of which it drives the transfer roll 62 and also meshes with a gear indicated by the pitch line 203 rotatable upon the sprocket shaft 204 at one end of the delivery conveyor 16. An external drive chain 206 is provided for the delivery conveyor 16 which is arranged to interconnect the sprocket shaft 204 with the sprocket shaft 208 at the outer end of said conveyor thus driving said conveyor from its outer end and keeping taut the upper run of the conveyor chains. It will be seen thus that the direction of the motion of the presenting conveyor 14 and the rolls 10 and 12, the transfer roll 62 and the delivery conveyor are all such as to cause a steady progress of the pieces of work through the machine. The operator presenting work to the machine deposits the various pieces upon the conveyor 14 without danger of getting in contact with the cement rolls and the pieces of work after passing between the applying rolls 10 and 12 are removed therefrom, if necessary, by the work strippers 60 and 120 and pass over the transfer roll 62 to the delivery conveyor 16, from which they are dropped onto the drying conveyor 18.

Having thus described my invention, what I claim is new and desire to secure by Letters Patent of the United States is:

1. In a machine for cementing shoe parts, a main frame, cementing mechanism in said frame, means for removing the cemented articles from said mechanism comprising a delivery conveyor, a conveyor frame for adjustably supporting said conveyor upon said main frame, said conveyor frame being pivoted on said main frame to allow the angle of the conveyor with respect to the horizontal to be varied and having a slotted extension alongside said main frame, and a clamp screw extending through the slot in said extension to secure it in adjusted position on said main frame.

2. In a machine for cementing shoe parts, cementing mechanism, means for removing the cemented articles from said mechanism comprising an adjustable bracket on said machine, a conveyor mounted on said bracket, and a transfer roll also mounted on said bracket and interposed between said cementing mechanism and said conveyor.

3. In a machine for cementing shoe parts, cementing mechanism, means for transferring cemented articles away from said mechanism comprising an adjustable supporting bracket for said transferring means, a work stripper for the cementing mechanism to ensure delivery of cemented articles to said transfer means, and means for adjustably supporting said work stripper upon said bracket constructed and arranged to permit adjustment of the stripper so as to compensate for adjustments of the supporting bracket.

4. In a machine for cementing shoe parts, cementing mechanism, means for removing the cemented articles from said mechanism comprising angularly adjustable brackets, a driven conveyor supported on said brackets for adjustment therewith with respect to the cementing mechanism, and cleaning means mounted on a swinging support and cooperating with the under run of said conveyor to remove surplus cement therefrom, said swingingly mounted cleaning means being constructed and arranged to engage the conveyor over a wide range of adjustment of said conveyor.

5. In a machine for cementing shoe parts, cementing mechanism, means for removing the cemented articles from said mechanism comprising a conveyor adjustably mounted upon said machine so that its angle with respect to the horizontal may be varied thereby to deliver pieces of work to another mechanism situated at another level, and a ribbed transfer roll interposed between the cementing mechanism and the conveyor.

6. In a machine for cementing shoe parts, driven cementing mechanism, means for removing the cemented articles from said mechanism comprising a delivery conveyor having upper and lower runs, and means for driving said delivery conveyor connecting the cementing mechanism and the delivery conveyor and unconnected to the near end of the delivery conveyor, said driving means being constructed and arranged to maintain the upper run of the delivery conveyor taut.

7. In a machine for cementing shoe parts, a cement roll, means for driving said roll, means for removing an article to which cement has been applied by said roll comprising a delivery conveyor positioned adjacent to said roll, said conveyor comprising upper and lower runs at the ends of which are rotatable supports, and means for maintaining the upper run of said conveyor taut and for driving the conveyor comprising a driving connection between the driving means for the cement roll and the rotatable support for the outer end of the conveyor.

8. In a machine for cementing shoe parts, cementing mechanism, means for removing the cemented articles from said mechanism comprising a conveyor, brackets constructed and arranged adjustably to support said conveyor on the frame of the cementing machine, a frame for said conveyor in which are rotatably mounted supports for the opposite ends of the conveyor, and means for detachably connecting said conveyor frame to said brackets whereby the conveyor may be removed from the machine without disturbing the adjustment of the brackets.

9. In a cementing machine, a roll, a work stripper cooperating with the surface of said roll and adjustably mounted upon the machine, means for determining the adjusted position of the latter means comprising an adjustable abutment against which said adjustable work stripper rests and from which it is freely removable, and movable clamping means for holding said adjustable work stripper in contact with said abutment, whereby the adjusted position of the abutment will determine the clamped relation of the stripper and roll, said adjusted position being unaffected by the withdrawal or replacement of the stripper and its clamping means.

10. In a cementing machine, a machine frame, a roll, means comprising a pivoted frame arranged to cooperate with said roll, means for determining the position of said frame with respect to said roll comprising an adjustable abutment on the machine frame supporting said pivoted frame against turning movement in one direction, and clamping means for holding said frame in contact with said abutment against turning movement in the other direction.

11. In a cementing machine, a machine frame, a roll, means comprising a pivoted frame arranged to cooperate with the surface of said roll, means for determining the adjusted position of said pivoted frame comprising an adjustable abutment interposed between said machine frame and said pivoted frame, and clamping means for holding said pivoted frame in the position determined by said abutment, said clamping means being releasable to release the pivoted frame without disturbing the adjustment of the abutment.

12. In a cementing machine, a cylindrical applying roll, a work stripper cooperating with the peripheral surface of said roll, an adjustable frame supporting said stripper, and means for determining the adjusted position of said frame comprising an adjustable abutment and clamping means for releasably holding the frame in contact with the abutment.

13. In a cementing machine, a main frame, a cement applying roll journalled therein, a work stripper cooperating with the peripheral surface of said roll, a frame supporting said stripper, removable pivot pins for pivotally mounting said stripper frame upon the machine, and adjustable means mounted on the main frame for determining the adjusted position of the stripper frame constructed and arranged to allow the removal of the stripper frame and its repositioning upon the machine without disturbing the adjustment previously determined.

14. In a cementing machine, a cylindrical applying roll, means for supplying cement to said roll comprising an open-sided receptacle the edges of the open side of which are brought into close relation to the roll to prevent the accidental leakage of cement, said receptacle being pivotally mounted upon the machine so that the position with respect to the roll of the bottom edge of the open side of the receptacle may be adjusted thereby to control the quantity of cement taken out of the receptacle by the roll, means interposed between the ends of the roll and the receptacle to prevent leakage in all adjusted positions of said receptacle, and means for tilting said receptacle on its pivot thereby to determine the position of the receptacle in the machine.

15. In a cementing machine, a cylindrical cement applying roll, means for supplying cement to said roll, comprising an open-sided receptacle positioned with its open side adjacent to the periphery of the roll, means for pivotally supporting said receptacle on the machine, and means for swinging the receptacle on its pivot thereby to determine the quantity of cement removed from the receptacle by the applying roll, said means comprising an adjustable abutment adapted to be secured in predetermined position and against which a portion of the receptacle rests loosely, and locking means for clamping the receptacle tightly against the abutment.

16. In a cementing machine, a cement applying roll, a fountain receptacle for delivering cement to the roll having an open side closed by said roll with the lower edge of said side acting as a scraper to determine the amount of cement taken out of the receptacle by the roll, said fountain receptacle being pivotally mounted in the machine whereby said lower edge may be swung toward and away from the roll and having a rigid extension in the form of an upstanding arm, and means cooperating with said arm for determining the position of the scraper edge of the receptacle.

17. In a cementing machine, a cylindrical applying roll, an open-sided fountain receptacle for supplying cement to said roll having the lateral edges of its open side overlapping and in cement-tight relation to the roll and its lower edge constructed and arranged to act as a scraper to determine the amount of cement taken out of the receptacle by the roll, a removable pivot for said receptacle, and means for swinging said receptacle on its pivot to determine the adjusted position constructed and arranged to allow the removal of the receptacle and its repositioning upon the machine without disturbing the adjustment previously determined.

18. In a cementing machine, a cylindrical applying roll, a fountain receptacle for delivering cement to said roll above the level of the work, a barometric supply tank for said receptacle tiltably mounted on the machine and arranged with its outlet dipping in said receptacle in one of its positions, and a valve in the outlet of said barometric supply.

19. In a cementing machine, a frame, a work-contacting roll, a support for said roll pivotally mounted in the frame of the machine, an adjusting screw bearing against a portion of the support for said work-contacting roll constructed and arranged to determine the position of said roll with respect to the machine, a hand wheel slidably and non-rotatably connected to said screw, opposed teeth on said wheel and said frame respectively, and a spring arranged to force the teeth into normal engagement.

20. In a cementing machine, a roll, adjustable members cooperating with said roll having adjusting screws positioned above the roll, a cover for said roll and adjusting screws pivotally mounted on the frame of the machine, a tank for supplying cement to said roll pivotally mounted on the frame of the machine, and a connection between the tank and said cover whereby the tilting of the tank automatically lifts the cover.

In testimony whereof I have signed my name to this specification.

JOHN W. COSGROVE.